US009384281B2

(12) United States Patent  (10) Patent No.: US 9,384,281 B2
Rathod et al.  (45) Date of Patent: Jul. 5, 2016

(54) METHOD OF GESTURE-BASED DEFINITION OF AN OBJECT WITHIN AN IMAGE

(71) Applicant: Imaginestics, LLC, West Lafayette, IN (US)

(72) Inventors: Nainesh Rathod, West Lafayette, IN (US); Jamie Tan, West Lafayette, IN (US); Joseph Czepil, West Lafayette, IN (US); Tanvi Srivastava, West Lafayette, IN (US)

(73) Assignee: Imaginestics, LLC, West Lafayette, IN (US)

( * ) Notice: Subject to any disclaimer, the term of this patent is extended or adjusted under 35 U.S.C. 154(b) by 203 days.

(21) Appl. No.: 14/214,125

(22) Filed: Mar. 14, 2014

(65) Prior Publication Data

US 2014/0280003 A1 Sep. 18, 2014

Related U.S. Application Data

(60) Provisional application No. 61/791,666, filed on Mar. 15, 2013.

(51) Int. Cl.
 *G06F 17/30* (2006.01)
(52) U.S. Cl.
 CPC .... *G06F 17/30864* (2013.01); *G06F 17/30277* (2013.01)

(58) Field of Classification Search
 CPC ............... G06F 17/30864; G06F 17/30277
 USPC .......... 707/705–708, 749, 758, 771, 754, 56; 345/173
 See application file for complete search history.

(56) References Cited

U.S. PATENT DOCUMENTS

| 2006/0251338 | A1* | 11/2006 | Gokturk | ............ G06F 17/30253 382/305 |
| 2011/0007029 | A1* | 1/2011 | Ben-David | .............. G06F 3/044 345/174 |
| 2012/0017147 | A1* | 1/2012 | Mark | ..................... G06F 1/1639 715/702 |
| 2012/0323738 | A1* | 12/2012 | Gokturk | ................. G06Q 30/02 705/26.63 |
| 2013/0077887 | A1* | 3/2013 | Elton | .................... G06T 3/4053 382/264 |
| 2013/0275411 | A1* | 10/2013 | Kim | .................. G06F 17/30277 707/722 |

* cited by examiner

*Primary Examiner* — Hares Jami
(74) *Attorney, Agent, or Firm* — Keith Swedo

(57) ABSTRACT

A method of defining input to an image-based search engine includes displaying and image on a screen and detecting at least three points touched by a user on the image. An object in the image is identified having the at least three points as vertices. The identified object is inputted to an image-based search engine. Portions of the image not included within the object are excluded from the input to the image-based search engine.

20 Claims, 10 Drawing Sheets

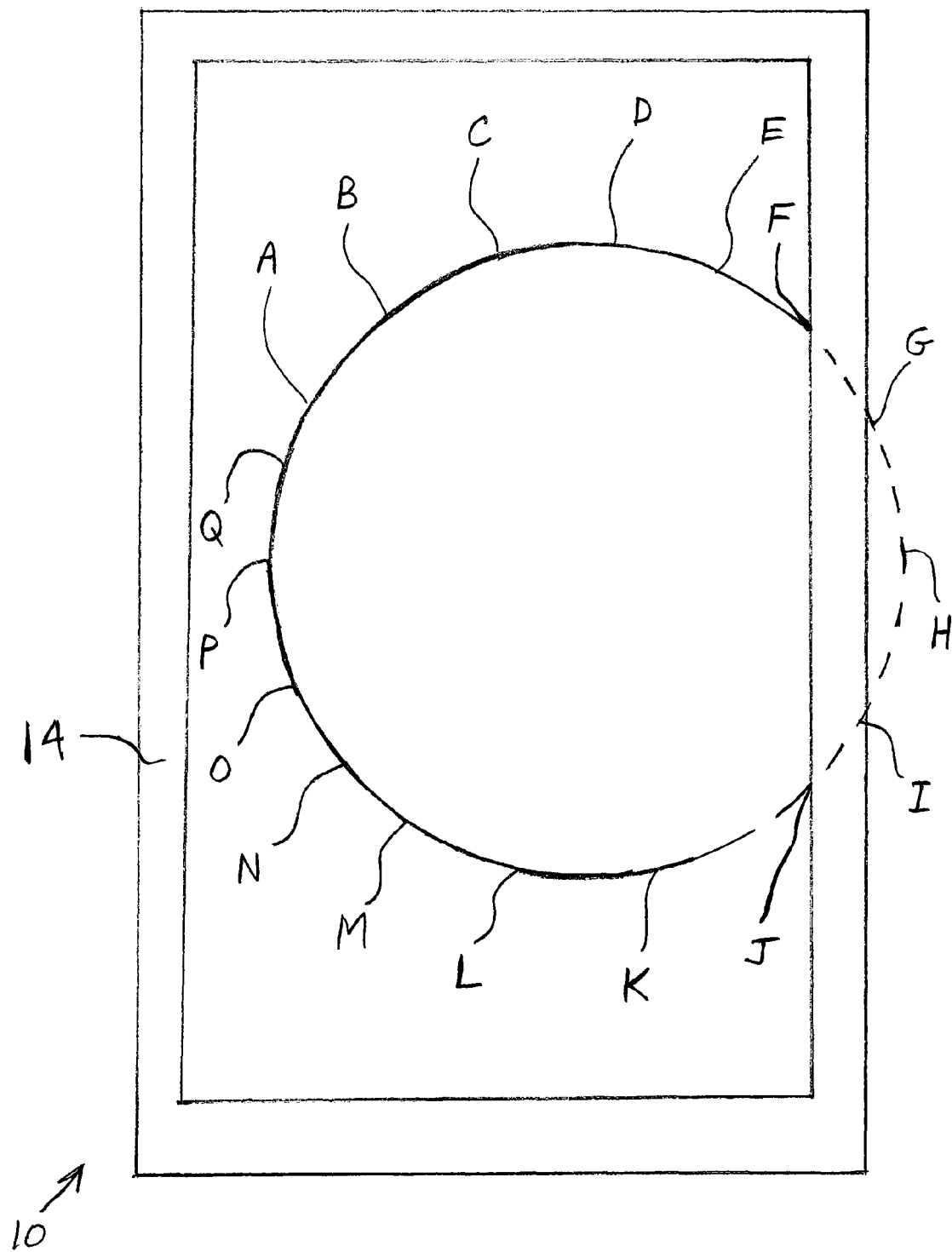

METHOD OF GESTURE-BASED DEFINITION OF AN OBJECT WITHIN AN IMAGE

RELATED APPLICATIONS

This application claims the benefit of U.S. Provisional Application 61/791,666 filed Mar. 15, 2013, which is hereby incorporated by reference herein.

BACKGROUND OF THE INVENTION

Field of the Invention

The present invention relates to a system and method of operating an image-based search engine.

SUMMARY OF THE INVENTION

The invention may provide an arrangement for using hand gestures, or other movements of a user's hand relative to a screen, to provide inputs to an image-based search engine.

The invention comprises, in one form thereof, a method of defining input to an image-based search engine, including displaying and image on a screen and detecting at least three points touched by a user on the image. An object in the image is identified having the at least three points as vertices. The identified object is inputted to an image-based search engine. Portions of the image not included within the object are excluded from the input to the image-based search engine.

The invention comprises, in another form thereof, a method of defining input to an image-based search engine, including displaying an image on a screen and detecting a plurality of points touched by a user on the image. An order in time in which the points were touched by the user is sensed. An object in the image is identified having the points as vertices and a respective substantially straight edge between each consecutively touched pair of the points. The identified object is inputted to an image-based search engine. Portions of the image not included within the object are excluded from the input to the image-based search engine.

The invention comprises, in yet another form thereof, a method of defining input to an image-based search engine, including displaying an image on a screen and detecting a plurality of points touched by a user on the image. Each of the points represents a respective location along a profile of an object that is fragmentarily displayed in the image. The fragmentarily displayed image of the object is extrapolated beyond at least one border of the screen to thereby produce an extrapolated image of the object. The extrapolating is performed dependent upon the detecting step. The extrapolated image of the object is inputted to an image-based search engine.

An advantage of the invention is that the user may more easily create inputs to an image-based search engine.

BRIEF DESCRIPTION OF THE DRAWINGS

FIG. 3b is a schematic view of a mobile electronic device having on its screen yet another object identified by a user according to yet another embodiment of the present invention.

DESCRIPTION OF THE PRESENT INVENTION

In one embodiment, the invention may be applied to a search engine that may search for images of two or more dimensions.

Figure 1A:
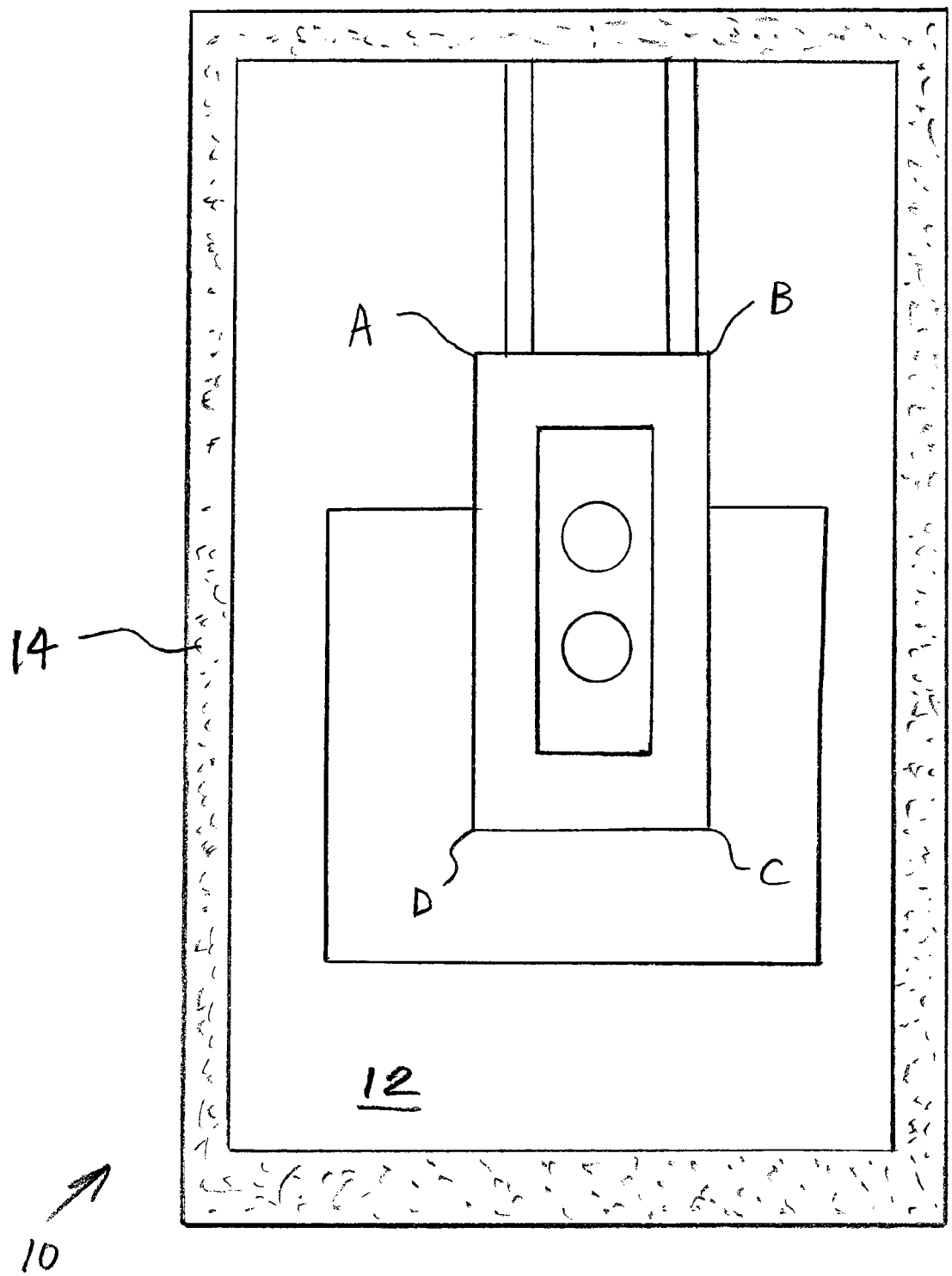
FIG. 1a is a schematic view of a mobile electronic device having on its screen an object identified by a user according to one embodiment of the present invention.
Figure 1B:
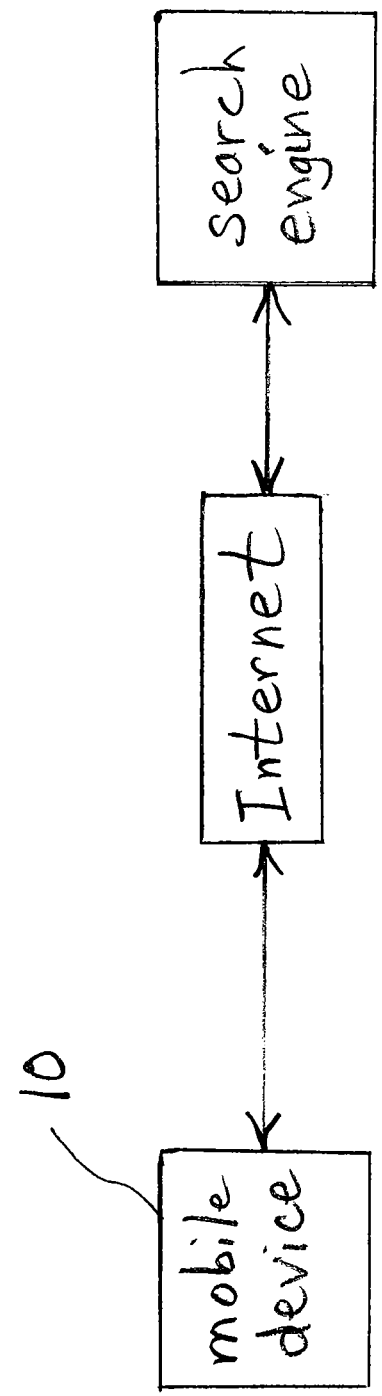
FIG. 1b is a block diagram of one embodiment of an image-based search engine arrangement of the present invention.

In FIG. 1a there is shown a mobile electronic device 10 (e.g., an iPhone) having a touch-sensitive display screen 12 surrounded on all four sides by a plastic frame 14 serving as a border of screen 12. An image, or part of an image, on screen 12 may be used as an input to an image-based search engine that searches a database for other images in the database that match or are similar to the image on screen 12 at least in some respect. Device 10 may be connected to the search engine through a hard wire connection or wirelessly, and may be connected to the search engine directly or indirectly such as via the Internet, as shown in FIG. 1b.

The user may not want the entire image shown in FIG. 1a to be used as input to the search engine. For example, the user may want only the part having vertices A, B, C and D ("part ABCD") to be used as input to the search engine. Thus, in one embodiment, the user may identify part ABCD to the search engine by touching screen 12 with his finger at each of vertices A, B, C and D, and pulling his finger away from screen 12 after each touch. After some period of time since the last screen touch (e.g., ten seconds, or some function of the time periods between the touching of vertices A, B, C and D), the search engine may assume that the object to be searched for has been defined by the user, and thus may begin the search. Vertices A, B, C and D may be touched sequentially, in some arbitrary order, simultaneously, or in any combination of the foregoing.

Device 10 may provide feedback by highlighting each of the points touched on screen 12 with a yellow semi-transparent circle of radius of about 3 mm being superimposed over each touched point. The user may de-select or delete a touched point by sweeping the side of his finger across the highlighted point in order to "erase" it.

Because at least three vertices may be required to define an object, one or two touches on the screen by the user within a predetermined period of time may indicate information to the search engine other than the vertices of an object. For example, a single touch on an object on the screen may indicate that the object is a bar code and should be read as such; and two touches on an object may indicate that the object is a QR code.

Figure 2A:
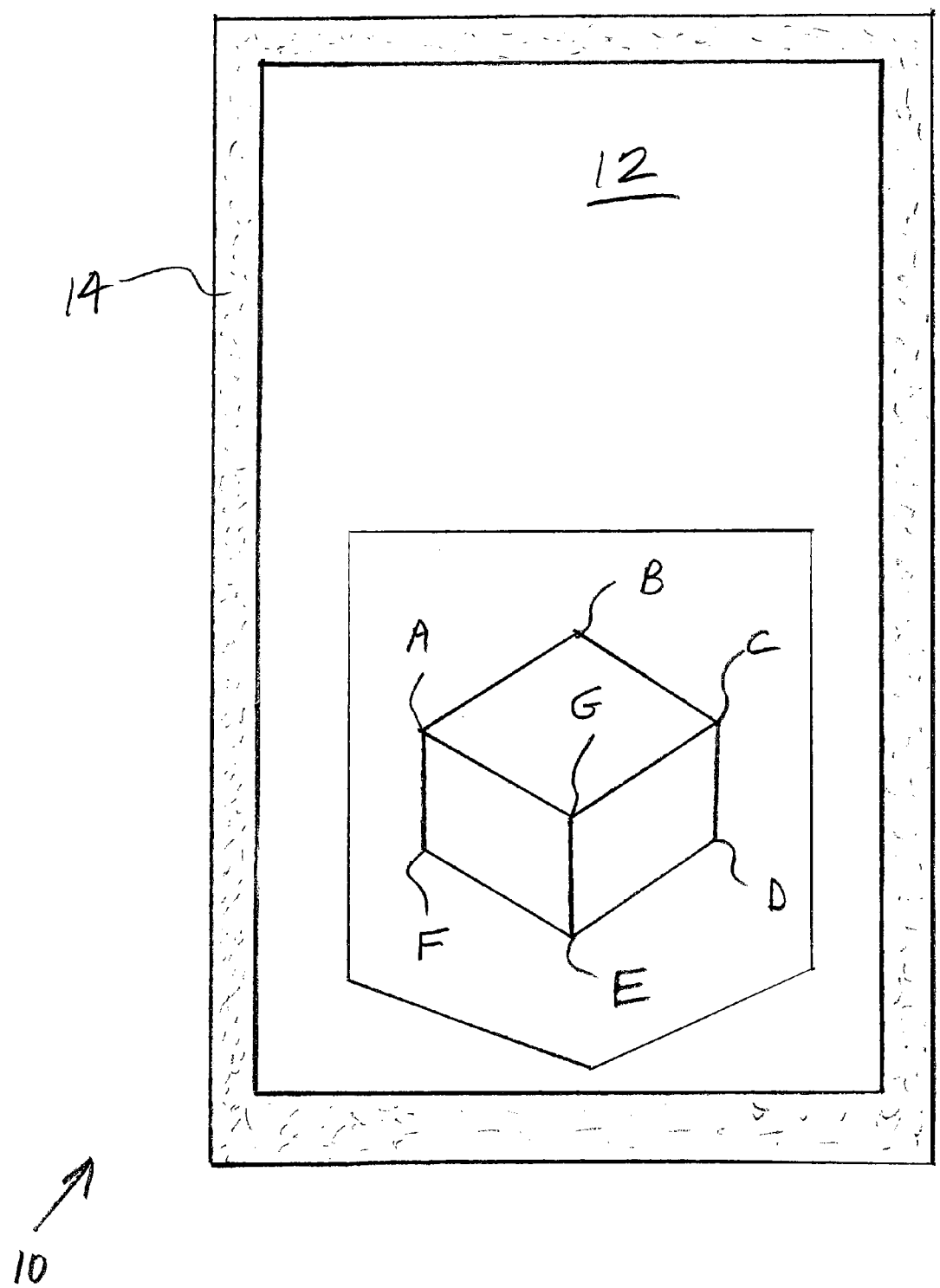
FIG. 2a is a schematic view of a mobile electronic device having on its screen another object identified by a user according to another embodiment of the present invention.

In the image shown in FIG. 2a, the object that the user wants to enter into the search engine is defined by vertices A, B, C, D, E and F. However, in one embodiment, the user may provide more information to the search engine by also touching vertex G in order to thereby inform the search engine that the object has a corner at that point in the image. Thus, the search engine may more accurately determine the three-dimensional shape of the object.

In one embodiment, the search engine may be able to discern from the image and from the indication of vertex G the presence of the edges between vertices A and G, between vertices G and C, and between vertices G and E. However, in another embodiment, the user may draw in the edges by running his finger on the screen between vertices A and G, between vertices G and C, and between vertices G and E.

Figure 2B:
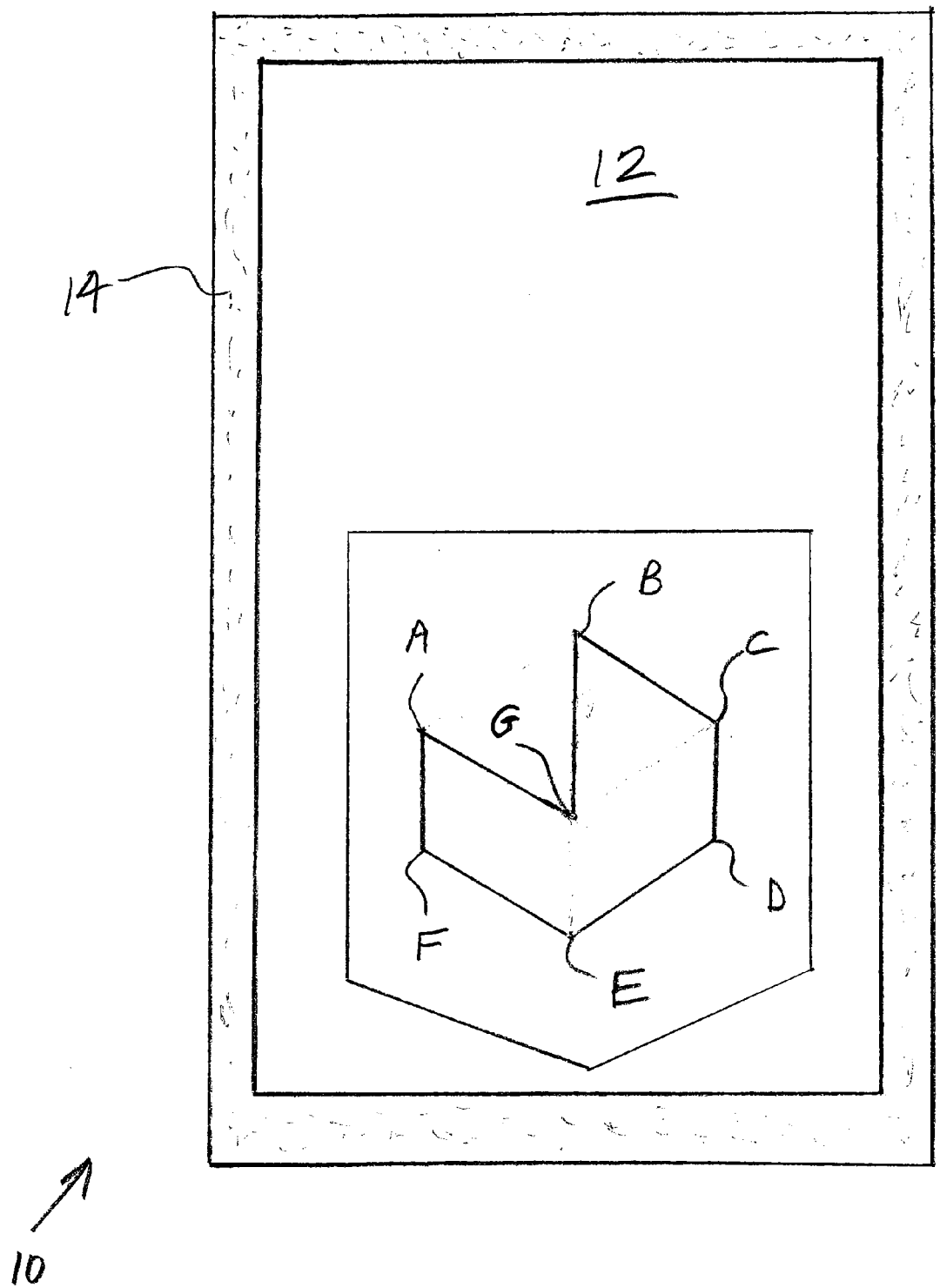
FIG. 2b is a schematic view of a mobile electronic device having on its screen yet another object identified by a user according to yet another embodiment of the present invention.
Figure 2C:
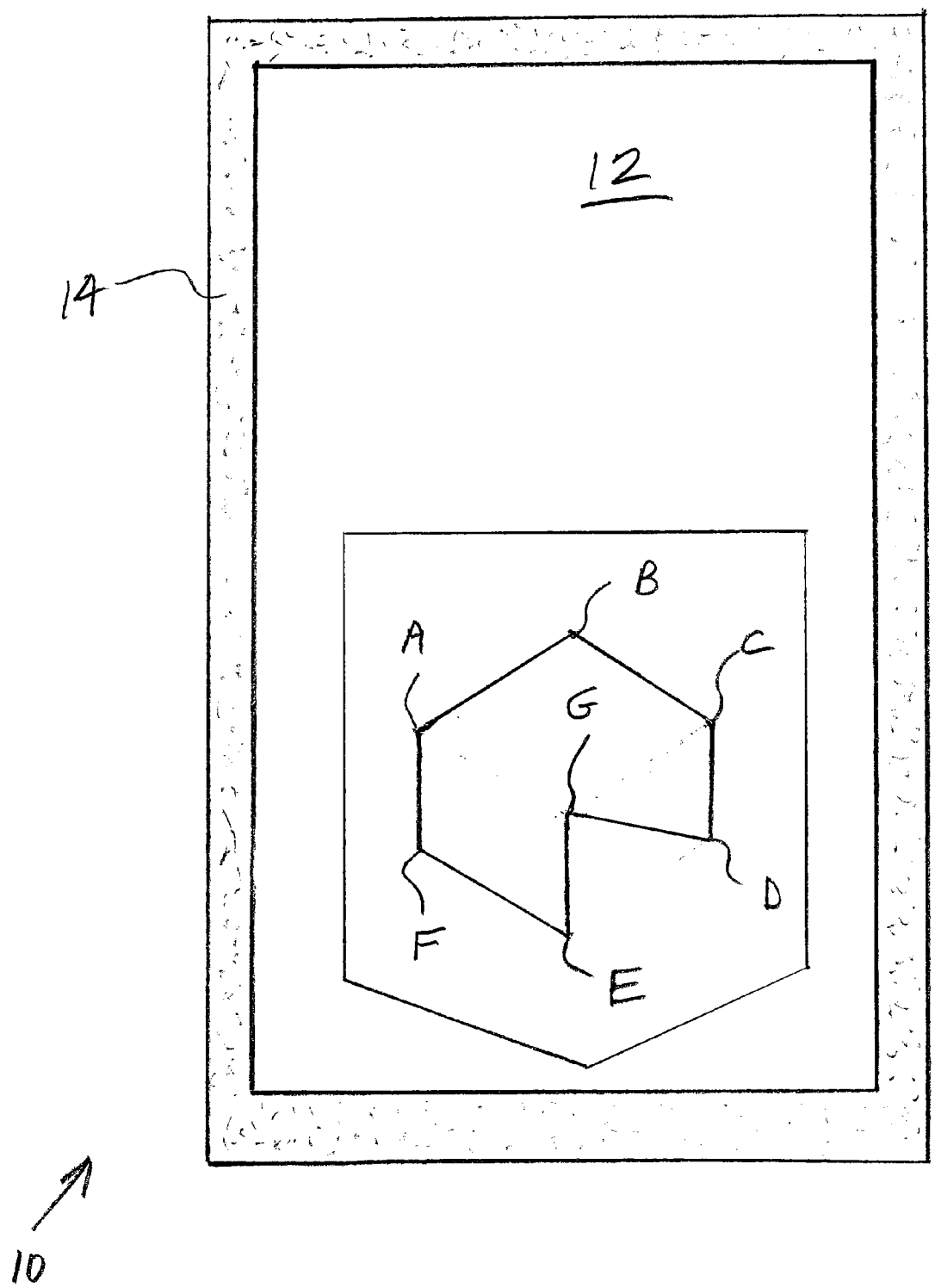
FIG. 2c is a schematic view of a mobile electronic device having on its screen still another object identified by a user according to the embodiment of FIG. 2b.
Figure 2D:
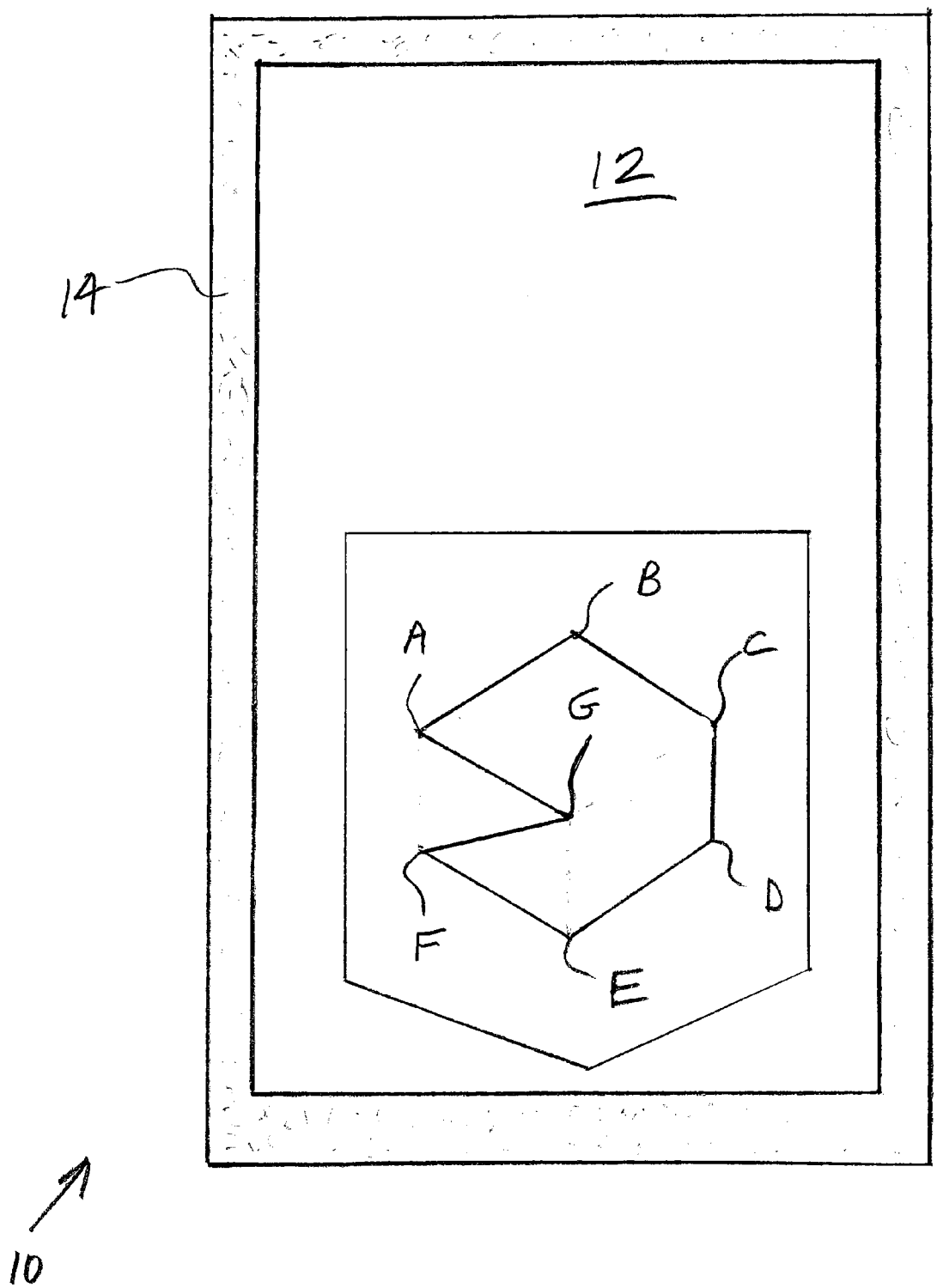
FIG. 2d is a schematic view of a mobile electronic device having on its screen a further object identified by a user according to the embodiment of FIG. 2b.

In another embodiment, the search engine may interpret an "internal" vertex G as being a vertex along the border or outline of the object, just as are vertices A, B, C, D, E and F. The search engine may define the border edges of the object as being between two successively touched points. For example, if the user were to touch the vertices in the order A, G, B, C, D, E, F, then the object would be interpreted as having the profile shown in FIG. 2b. As another example, if the user were to touch the vertices in the order F, A, B, C, D, G, E, then the object would be interpreted as having the profile shown in FIG. 2c. As yet another example, if the user were to touch the vertices in the order D, C, B, A, G, F, E, then the object would be interpreted as having the profile shown in FIG. 2d. Thus, device 10 may determine an order in time in which the user touched the points representing the vertices, and then may identify an object in the image having the points as consecutive vertices in the order the vertices were touched by the user. An object in the image is identified having the points as vertices and a respective substantially straight edge between each consecutively touched pair of the points. As used herein vertices may be referred to as being "consecutive" if there is no other vertex indicated by the user as being between the two consecutive vertices along the profile of the object image.

On the other hand, if the user wishes to indicate to the search engine that vertex G represents a corner of the object not along the profile of the object, but rather a corner projecting towards the viewer, then the user may touch vertex G twice in succession.

Figure 3A:
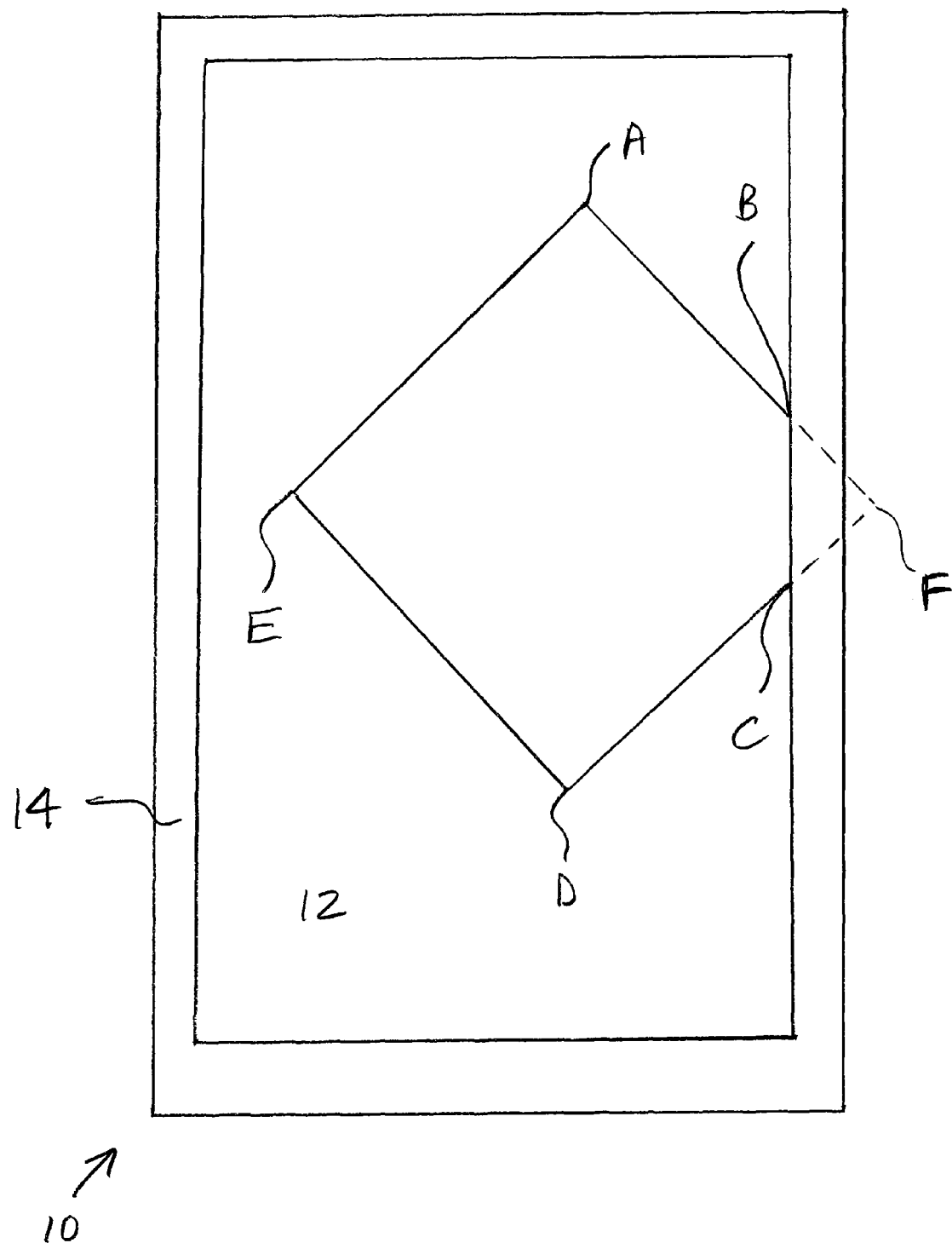
FIG. 3a is a schematic view of a mobile electronic device having on its screen another object identified by a user according to another embodiment of the present invention.

In some cases, an available image does not completely capture the subject object, but the user nevertheless desires to use the image as a search engine input. FIG. 3a shows such an instance in which the right-hand corner of a part AFDE is "cut off" or not included in the available image such that the part is only fragmentarily displayed. In one embodiment, the user may imperfectly define the object by touching vertices A, B, C, D and E. Each of the points represents a respective location along a profile of the part. Software may recognize that points B and C are near (e.g., within a predetermined distance of) the edge or border of the screen, and thus may assume that some portion of the object is not shown in the image, but may nonetheless include the assumed missing portion of the object in the input to the search engine. For example, the software may extrapolate line segments AB and DC to thereby determine or assume that these line segments meet or intersect at vertex F. Accordingly, the assumed rectangular object shape defined by AFDE may be used as search engine input. Thus, the fragmentarily displayed image of the object is extrapolated beyond at least one border of the screen based on the detected touched vertices A, B, C, D and E to thereby produce an extrapolated image of the object.

1. In another embodiment, instead of touching vertices B and C, the user touches vertex E and simultaneously touches vertices A and D with two different fingers. The user may then drag the finger at vertex A along line segment AB and simultaneously or sequentially drags a finger at vertex D along line segment DC. The software may then interpret the simultaneous touching of vertices A and D and finger dragging along line segments AB and DC as meaning that line segments AB and DC meet or intersect at some point off screen. The software may then calculate the point of intersection as vertex F and accordingly use the assumed object shape defined by AFDE as search engine input. Thus, the user may indicate that the part is only fragmentarily depicted in the image by touching two points on the screen with two different fingers and running his fingers away from the respective two points in paths having directions such that extrapolations of the paths intersect at a location that is outside the border of the screen.

FIG. 3b shows another instance in which the right-hand end of a circular part A-Q is "cut off" or not included in the available image. In one embodiment, the user may imperfectly define the object by touching vertices A-F and J-Q and/or by dragging his finger at least partially along portions of the arcs of this circle. Software may recognize that points F and J are near the edge of the screen, and thus may assume that some portion of the object is not shown in the image, but may nonetheless include the assumed missing portion of the object in the input to the search engine. For example, the software may extrapolate the arc from vertex J clockwise to vertex F which defines about 270 degrees of a circle to thereby determine or assume that the circular arc continues along the remain 90 degrees of the circle through vertices G, H and I. Accordingly, the assumed circular object shape defined by A-Q may be used as search engine input. In another embodiment, instead of touching vertices F and J, the user simultaneously touches two other vertices, such as vertices Q and P with two different fingers. The user may then drag his finger at vertex Q along arc Q-F and simultaneously or sequentially drag a finger at vertex P along arc P-J. The software may then interpret the simultaneous touching of vertices Q and P and finger dragging along arcs Q-F and P-J as meaning that arcs Q-F and P-J meet, join or intersect at some point off screen. The software may then calculate arc F-J through vertices G, H, I and accordingly use the assumed object shape defined by the entire circle defined by points A-Q as search engine input.

Figure 4:
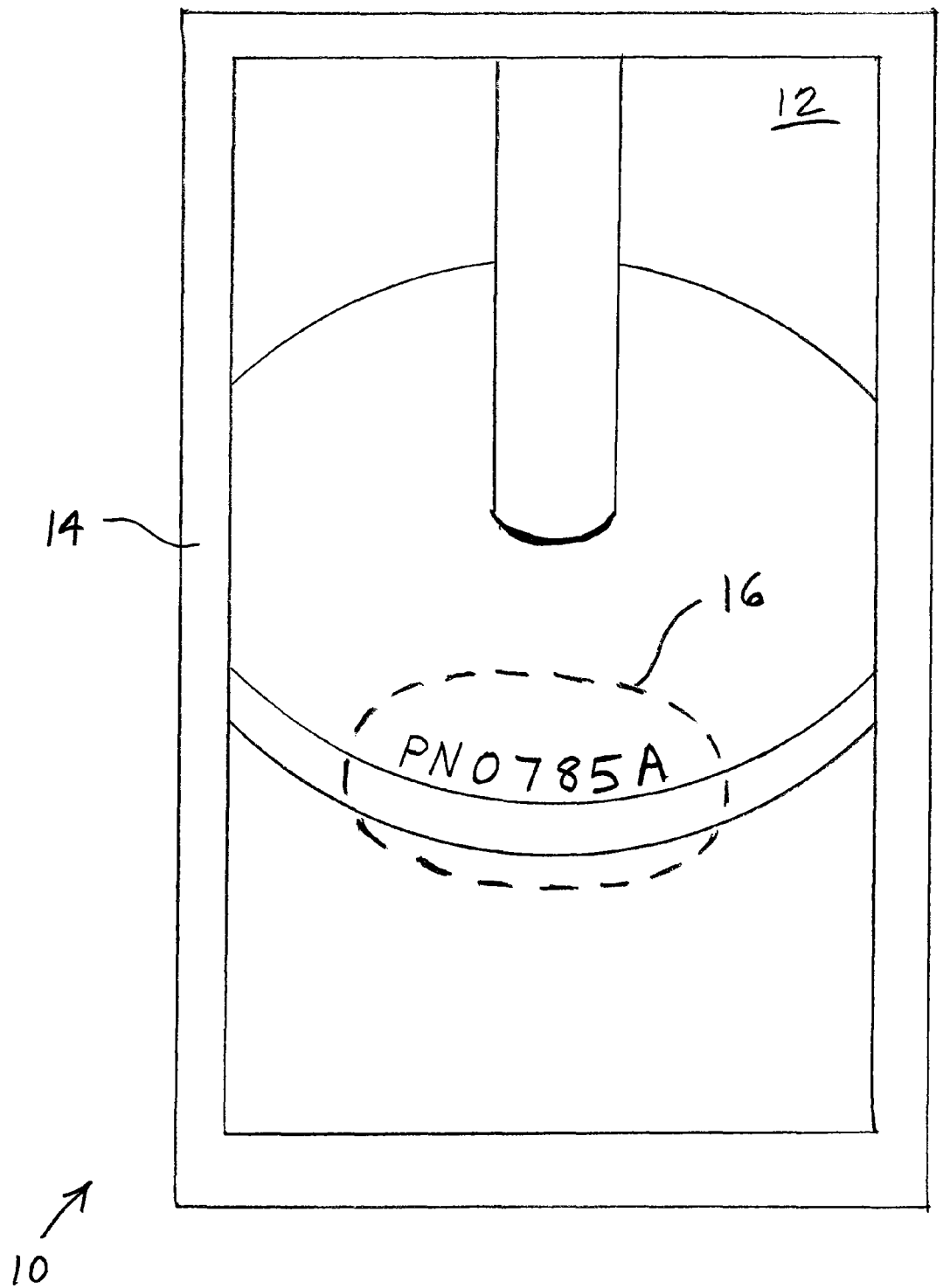
FIG. 4 is a schematic view of a mobile electronic device having on its screen still another object identified by a user according to still another embodiment of the present invention.

The present invention may include object characteristic recognition (OCR) features. A gesture by the user may be used to indicate the type of element in an image. For example, in the embodiment shown in FIG. 4, a user may indicate that a certain portion of an image includes text or alphanumeric characters. For example, the user use his finger to draw a circle around the text in the image; the user may draw a dashed line 16 around the text; the user may draw a circle around the text in the image and then speak "text", which may be detected by a microphone of device 10; or the user may draw a circle around the text in the image and then draw a large capital "A" (for "alphanumeric") or a large capital "T" (for "text") within the circle. The search engine then may ignore the text characters when performing the image-based search (because the text characters do not define the shape of the object), and/or the search engine may use the text in a text-based search which replaces or supplements the image-based search.

In another way that a gesture may be used by the user to indicate the type of element in an image, if an image includes a bar code, the user may swipe his finger across the bar code to thereby indicate that it is a bar code. The search engine then may ignore the bar code when performing the image-based search (because the bar code does not define the shape of the object), and/or the search engine may convert the bar code to text that is used in a text-based search which replaces or supplements the image-based search.

In other embodiments, a gesture may be used to indicate that an element of an object is an element that is to be searched for, or to indicate the weighting that the element should be given. For example, the user may use his finger to circle an element of an object that is to be searched for, or that should be given greater importance or a high level of weighting in the image-based search. In one embodiment, a user may tap an element a number of times within a predetermined time period (e.g., five seconds), wherein the number of times a tap occurs corresponds to the weighting that the element should be given in the image-based search. For example, assume that in an image of a chair the user would like to assign highest weighting to the back of the chair, second-highest weighting to the seat of the chair, third-highest weighting to the arm rest of the chair, and lowest weighting to the remainder of the chair, i.e., the legs of the chair. In order to input such weightings, the user may tap the back of the chair three times within five seconds, tap the seat of the chair two times within five seconds, and tap the arm rest of the chair once within five seconds. Device 10 may provide feedback to the user as to the weightings that have been assigned to the various elements as a result of the user's inputs. For example, the back of the chair may be highlighted in red semi-transparent color to indicate highest weighting, the seat of the chair may be highlighted in orange semi-transparent color to indicate second-highest weighting, and the arm rest of the chair may be highlighted in yellow semi-transparent color to indicate third-highest weighting. If device 10 has not interpreted the element tapped by the user as the user intended (e.g., the highlighted element has different border or profile than what the user had in mind), then the user may re-define the element by tapping on vertices and/or dragging his finger along the screen, as described above with reference to FIGS. 1-3.

Figure 5:
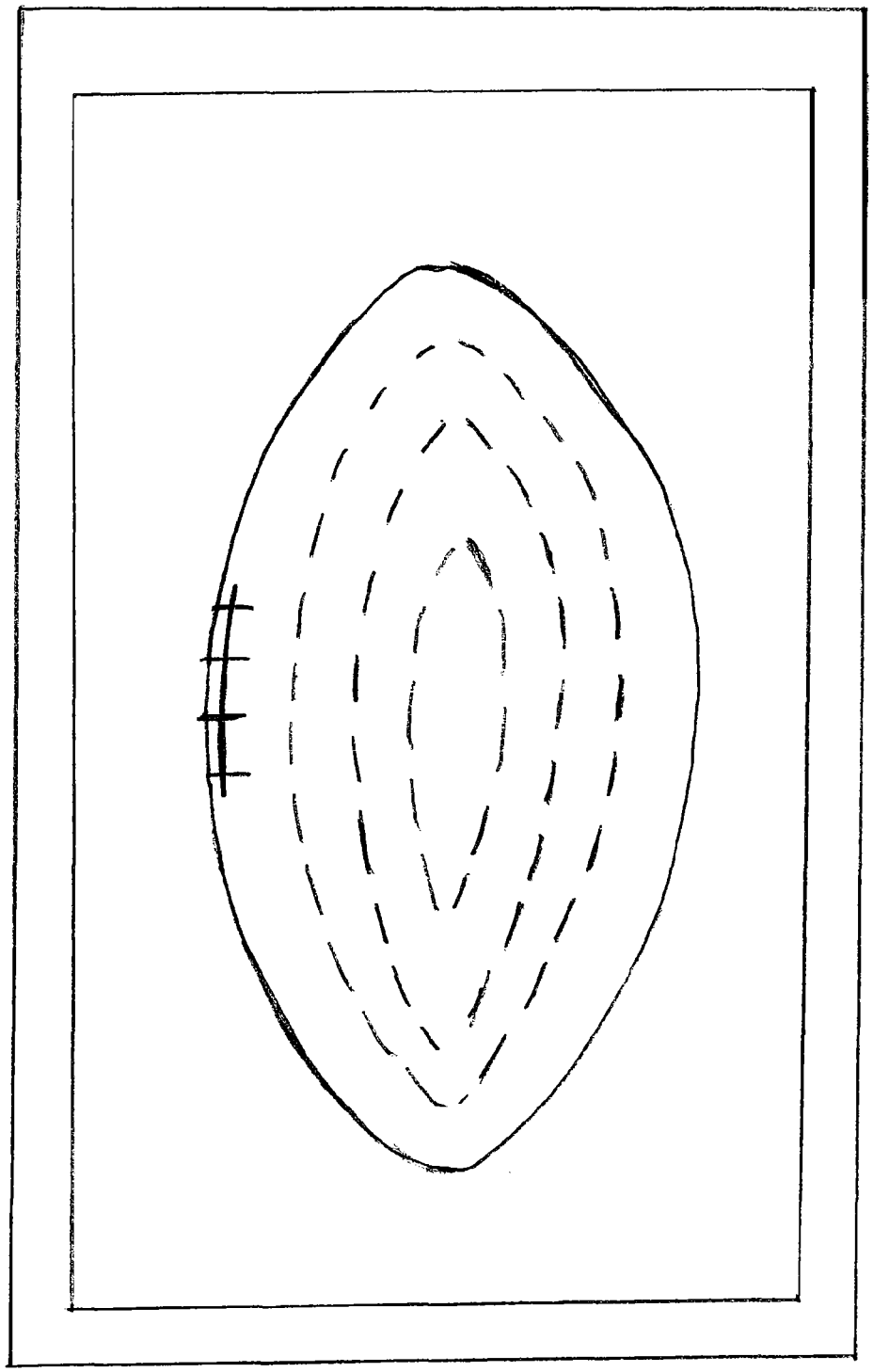
FIG. 5 is a schematic view of a mobile electronic device having on its screen a further object identified by a user according to a further embodiment of the present invention.

In one embodiment, the user may use gestures and possibly voice inputs in order to add three-dimensional characteristics to a two-dimensional image. For example, in the case of the image shown in FIG. 2a, the user may tap vertex G and say "this point is closest to the viewer." As another way of adding 3D information to a 2D image, the user may use continuous lines to indicate points on the object that are equidistant to the viewer. For example, in the image of the football shown in FIG. 5, the user has drawn with his finger three ovals, each of which defines points on the surface of the football that are equidistant from the viewer. However, the three ovals are shown in dashed lines in FIG. 5 for purposes of clarity of illustration. The ovals may be interpreted as being inputted by the user in order of decreasing distance to the viewer.

The invention has been described herein as being used in conjunction with a touch-sensitive screen in order to detect the screen touches. Alternatively, an overhead camera (not shown) may be positioned above any area that is designated to be used by the user to make gestures that define an object to be used as a search engine input. The designated area may be above or otherwise associated with a non-touch-sensitive computer screen, a table top, a wall, or any other flat surface that the user may touch or at least come close to touching.

The inputs captured by the camera may also be used to add 3D characteristics to a 2D image. For example, the user's hand gestures may be used to indicate how close the various portions of the 2D object are to the viewer. In the example of the football of FIG. 5, the user may place his finger at the upper tip of the football on the screen and may then move his fingertip in an arc peaking at about two inches high (i.e., above the surface of the screen) and again touching the screen at the lower tip of the football. In order to add further 3D information along another axis, the user may place his fingertip on the rightmost point of the football on the screen and may then move his fingertip in an arc peaking at about two inches high (i.e., above the surface of the screen) and again touching the screen at the leftmost point of the football on the screen. Thereby, device 10 is informed that the surface of the football arcs out toward the viewer, peaking at about two inches closer to the viewer than the outer boundary of the football.

As described in the embodiment immediately above, the camera may capture the movements of hand gestures in 3D space not just in isolation, but also relative to the screen and relative to particular parts of the object on the screen. In one embodiment, the camera captures images of not just the hand gestures, but also captures images of the image that device 10 is displaying on the screen so that the hand gestures can be defined relative to the displayed object. However, in another embodiment, the camera does not capture an image of the displayed image on the screen, but rather merely determines the location of the screen relative to the hand gestures. That is, the camera may detect the light being emitted from the screen and may detect the characteristic rectangular shape of the screen. Because the system "knows" what is being displayed on the screen, the system may determine the position of the user's hand relative to the various parts of the object being displayed on the screen just by sensing the position of the hand relative to the rectangular screen as a whole.

The invention has been described herein as including or interpreting hand gestures. However, gestures may be made other than exclusively by hand within the scope of the invention. For example, a computer mouse may be used to gesture such as by swiping or selecting vertices of the object to be searched for.

As described above, a user may use voice inputs to supplement gestures inputs to an image-based search engine. However, it is also possible within the scope of the invention for some inputs to be provided by the user entirely by voice. For example, the user may provide voice inputs such as "the object is closer to the viewer on the right side of the image", "text characters are on the lower left corner of the image", "a bar code is on the upper left corner of the image", or, in the case of FIGS. 3a-b above, "extend the object beyond the right edge of the image".

The invention has been described herein as involving the user touching the screen with his finger. However, it is to be understood that in each such instance it is also within the scope of the invention for the user to touch the screen with a stylus, or some other utensil besides his finger. Further, the invention may be described herein as including a user "drawing" on the screen. It is to be understood that such drawing may include the user dragging his finger, a stylus, or some other utensil besides his finger along the screen.

While this invention has been described as having an exemplary design, the present invention may be further modified within the spirit and scope of this disclosure. This application is therefore intended to cover any variations, uses, or adaptations of the invention using its general principles.

What is claimed is:
1. A method of defining input to an image-based search engine, comprising the steps of:
 displaying an image on a screen; detecting a plurality of points touched by a user on the image, each of the points representing a respective location along a profile of an object that is fragmentarily displayed in the image;

extrapolating the fragmentarily displayed image of the object beyond at least one border of the screen to thereby produce an extrapolated image of the object, the extrapolating being dependent upon the detecting step;

inputting the extrapolated image of the object to an image-based search engine;

detecting hand gestures and/or voice inputs from the user indicating relative weightings to be assigned various elements of the object in an image-based search by the image-based search engine;

performing the image-based search based in part on the relative weightings; and providing color coded feedback to the user to confirm the relative weightings indicated by the detected hand gestures.

2. The method of claim 1, further comprising the step of receiving an indication from the user that the object is fragmentarily displayed in the image.

3. The method of claim 1, further comprising the steps of:
detecting hand gestures and/or voice inputs from the user indicating that a portion of the object includes alphanumeric characters or a bar code;
automatically reading the alphanumeric characters or the bar code;
performing a text-based search based at least in part on the alphanumeric characters or the bar code; and
providing search results to the user based on both the image-based search and the text-based search.

4. The method of claim 1, further comprising the steps of:
detecting hand gestures and/or voice inputs from the user indicating a three-dimensional position of at least one point on the image; and
performing the image-based search based in part on the three-dimensional position of the at least one point on the image.

5. The method of claim 2 wherein the indication includes the user touching at least two said points with two different fingers.

6. The method of claim 5 wherein the indication further includes the user running his fingers away from the respective two points in paths.

7. The method of claim 6 wherein the paths have directions such that extrapolations of the paths intersect at a location that is outside the at least one border of the screen.

8. A method of defining input to an image-based search engine, comprising the steps of:
displaying an image on a screen; detecting a plurality of points touched by a user on the image, each of the points representing a respective location along a profile of an object that is fragmentarily displayed in the image;
extrapolating the fragmentarily displayed image of the object beyond at least one border of the screen to thereby produce an extrapolated image of the object, the extrapolating being dependent upon the detecting step;
inputting the extrapolated image of the object to an image-based search engine; and
receiving an indication from the user that the object is fragmentarily displayed in the image, the indication including the user touching at least two said points with two different fingers and running his fingers away from the respective two points in paths having directions such that extrapolations of the paths intersect at a location that is outside the at least one border of the screen.

9. The method of claim 8 wherein the two points are within a predetermined distance of the at least one border of the screen.

10. The method of claim 8, further comprising the step of detecting hand gestures and/or voice inputs from the user indicating that a portion of the object includes alphanumeric characters or a bar code.

11. The method of claim 10, further comprising the step of automatically reading the alphanumeric characters or the bar code.

12. The method of claim 11, further comprising the step of performing a text-based search based at least in part on the alphanumeric characters or the bar code.

13. The method of claim 12, further comprising the step of providing search results to the user based on both the image-based search and the text-based search.

14. The method of claim 8, further comprising the step of detecting hand gestures from the user indicating a three-dimensional position of at least one point on the image.

15. The method of claim 14, further comprising the step of performing the image-based search based in part on the three-dimensional position of the at least one point on the image.

16. The method of claim 8, further comprising the step of detecting voice inputs from the user indicating a three-dimensional position of at least one point on the image.

17. The method of claim 16, further comprising the step of performing the image-based search based in part on the three-dimensional position of the at least one point on the image.

18. The method of claim 8, further comprising detecting hand gestures and/or voice inputs from the user indicating relative weightings to be assigned various elements of the object in an image-based search by the image-based search engine.

19. The method of claim 18, further comprising performing the image-based search based in part on the relative weightings.

20. The method of claim 19, further comprising providing color coded feedback to the user to confirm the relative weightings indicated by the detected hand gestures.

* * * * *